Aug. 8, 1961 J. A. C. KORVER ET AL 2,995,654

SUPERHETERODYNE TELEVISION RECEIVER

Filed Oct. 28, 1959 4 Sheets-Sheet 1

INVENTOR
JAN ABRAHAM CORNELIS KORVER
PETER JOHANNES HUBERTUS JANSSEN
BY
[signature]
AGENT INVENTOR
jan abraham cornelis korver
peter johannes hubertus janssen
BY
Frank R. Jifoni
AGENT Aug. 8, 1961 J. A. C. KORVER ET AL 2,995,654

SUPERHETERODYNE TELEVISION RECEIVER

Filed Oct. 28, 1959 4 Sheets-Sheet 3

INVENTOR
jan abraham cornelis korver
peter johannes hubertus janssen
BY
Frank R. Jifari
AGENT INVENTOR
jan abraham cornelis korver
peter johannes hubertus janssen
BY
AGENT United States Patent Office 2,995,654

Patented Aug. 8, 1961

2,995,654

SUPERHETERODYNE TELEVISION RECEIVER

Jan Abraham Cornelis Korver and Peter Johannes Hubertus Janssen, Eindhoven, Netherlands, assignors to North American Philips Company, Inc., New York, N.Y., a corporation of Delaware Filed Oct. 28, 1959, Ser. No. 849,294

Claims priority, application Netherlands Oct. 29, 1958

11 Claims. (Cl. 250—20)

The invention relates to a superheterodyne television receiver comprising a circuit arrangement for automatic frequency control, the frequency characteristic curve of this receiver, from the input to the detector, having a so-called Nyquist flank, this receiver comprising a frequency discriminator to produce a control-signal, by which the local oscillator is readjusted, and an arrangement for producing the voltage for the automatic gain control.

Such television receivers have the advantage that, when switching on the receiver and commutating from one transmitter to the other, the local oscillator is always readjusted so that the frequencies of the produced intermediate-frequency image carrier and sound carrier assume the most favorable values for the intermediate-frequency pass curve.

This rigid coupling with a given place of the medium-frequency spectrum may, however, be less desirable under certain conditions. If, for example, a very weak signal is received, the local oscillator had to be readjustable so that the place of the image carrier shifts in the direction to the peak of the Nyquist flank. Thus the amplitudes of the image carrier and the low frequencies of the medium-frequency signal increase, which affects favourably both the interference level and the useful image quality. This is achieved, it is true, at the expense of the high frequencies, but in the case of such a weak signal, these frequencies would, anyhow, not appear to full advantage, so that a partial loss thereof would be insignificant.

The circuit arrangement employed in the receiver according to the invention is based on the recognition of the fact that the information of the incoming signal intensity is contained already in the voltage produced for the automatic gain control. The aforesaid purpose is therefore attained in a television receiver according to the invention by the fact that means are added to the discriminator which means are controlled by the voltage for the automatic gain control in a manner such that the place of the produced medium-frequency image carrier in the medium-frequency spectrum shifts toward the peak of the Nyquist flank.

Figure 1:
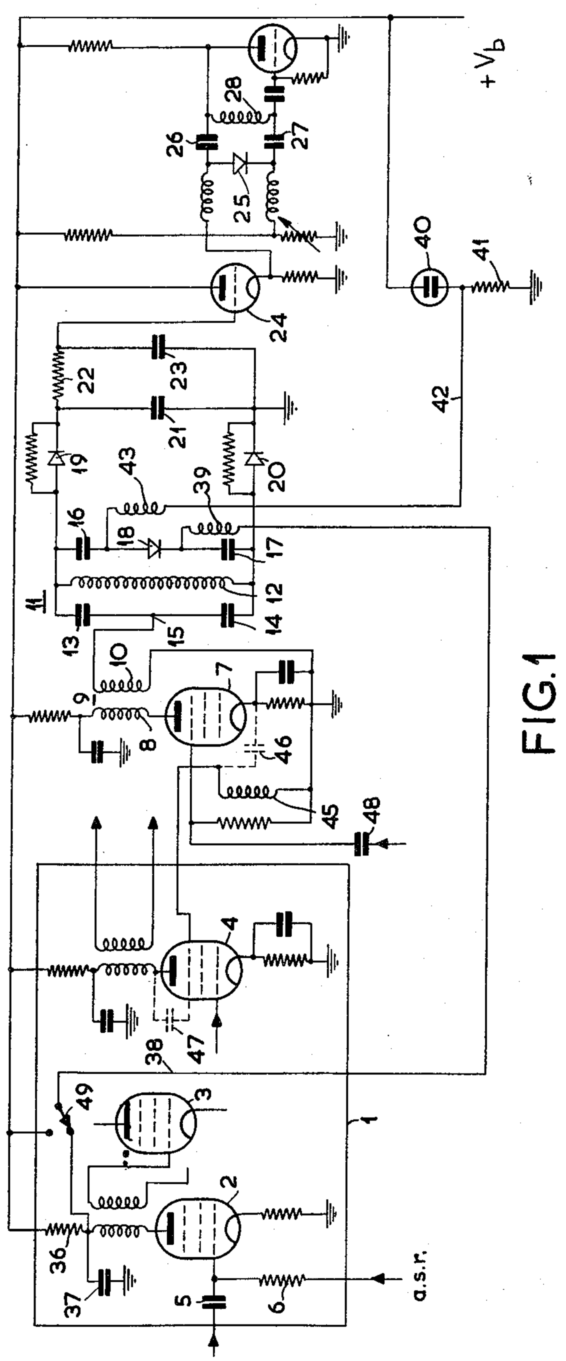

A few possible embodiments of a frequency-control automatic system according to the invention will now be described, by way of example, with reference to the accompanying diagrammatic drawing in which:

FIG. 1 shows those parts of a television receiver which are used directly or indirectly with the automatic frequency-control.

Figure 2:
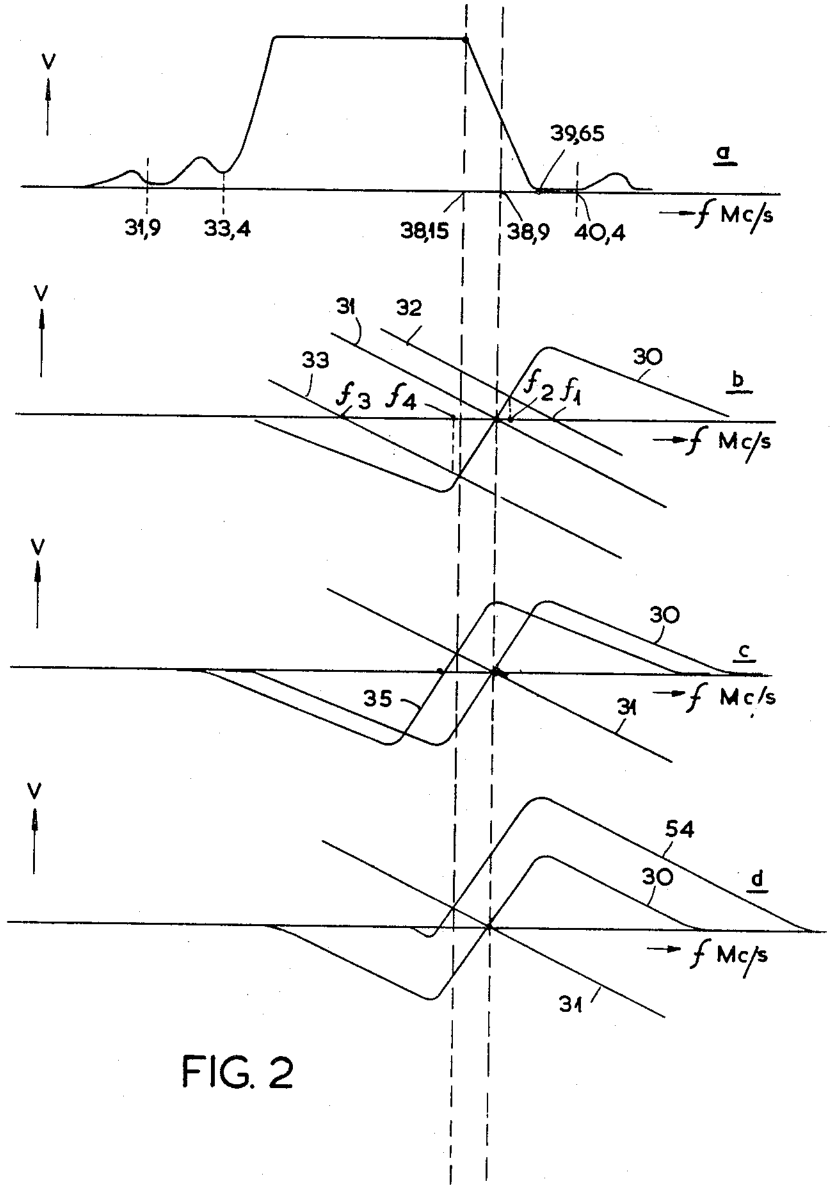
Figure 3:
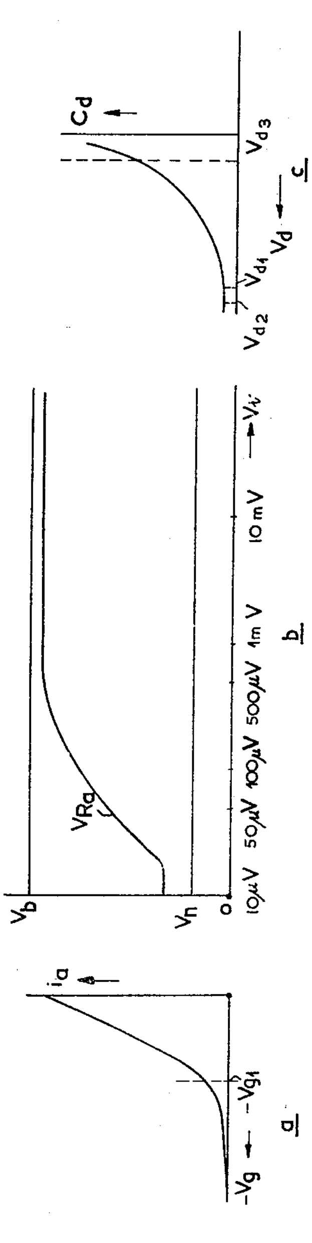

FIGS. 2 and 3 serve for explanation, and

Figure 4:
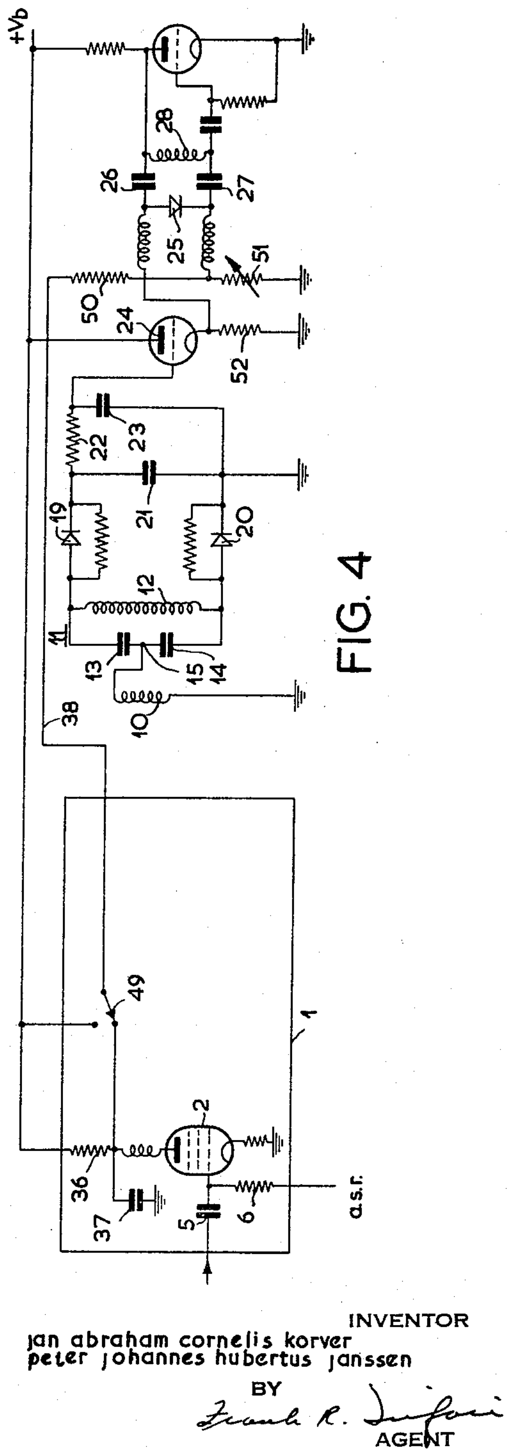
Figure 5:
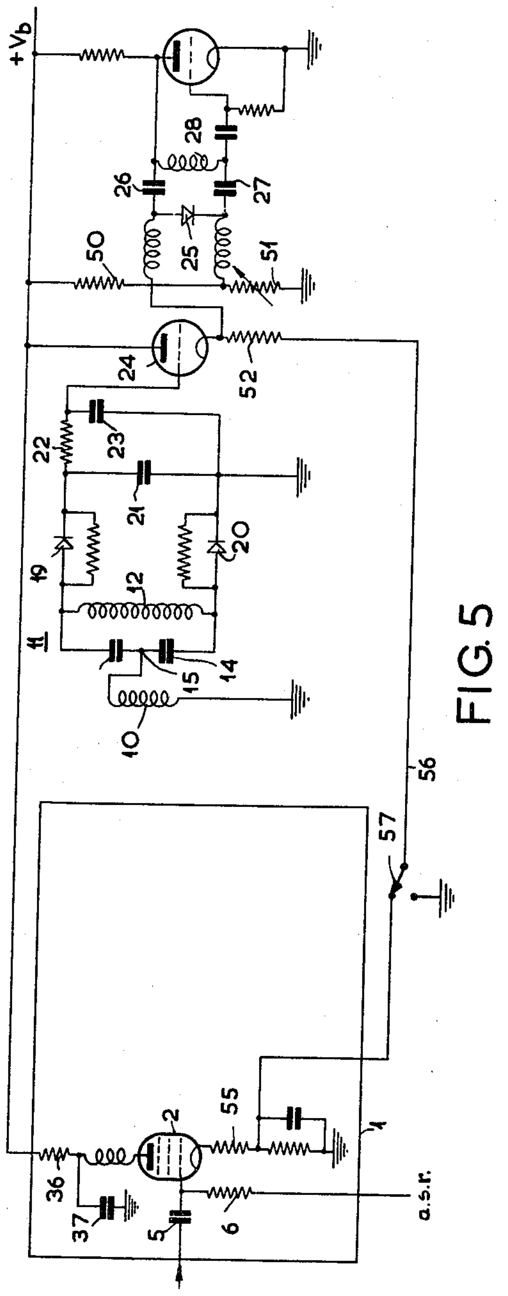

FIGS. 4 and 5 show further embodiments of a circuit arrangement for automatic frequency-control.

Referring to FIG. 1, the block 1 represents the medium-frequency portion of the receiver, in which only three intermediate-frequency amplifying valves 2, 3 and 4 are shown diagrammatically.

To the control-grid of valve 2 is fed, via the capacitor 5, the medium-frequency signal and, via the resistor 6, the automatic gain control-voltage obtained elsewhere from the receiver concerned. The output signal of valve 2 is fed to valve 3 and by way of any further medium-frequency amplifying valve, to the control-grid of the last medium-frequency valve 4.

The output signal of this valve is fed to a separate amplifying valve 7, associated with the control-circuit and of which the anode circuit includes the primary winding 8 of a transformer 9. With the winding 8 is coupled the secondary winding 10, of which one end is connected to the central tapping of the circuit 11, associated with the discriminator circuit. The circuit 11 comprises the coil 12, the capacitors 13 and 14, of which the junction 15 constitutes the said central tapping, the capacitors 16 and 17 and the diode 18. With the aid of the elements 12, 13, 14, 16, 17 and 18 the circuit 11 is tuned, under normal conditions, i.e. if a comparatively strong signal is received, to the frequency of the image carrier, which is determined by the medium-frequency circuits of the portion 1. In dependence of the frequency deviation of the really produced medium-frequency of the image carrier from the resonance frequency of the circuit 11, the alternating voltage at the rectifier 19 or that at the rectifier 20 dominates, so that a positive or a negative direct voltage respectively is produced across the capacitor 21. This voltage is fed via the smoothing network 22, 23 to the control-grid of the valve 24, associated with the reactance part.

By means of a control-mechanism, to be described more fully hereinafter, the current passing through the diode 25 is varied as a function of the voltage at the control-grid of valve 24. The diode 25 is connected, via the capacitors 26 and 27, in parallel with the coil 28, associated with the oscillator circuit, so that by variation of the current through the diode 25 the frequency of the oscillation produced by the oscillator can be varied.

The produced oscillator frequency is fed in known manner to the mixing stage, to which, in addition, the high-frequency signal is supplied. After mixing in this mixing stage, the medium-frequency signal is obtained, which contains the image carrier, of which the frequency can thus be readjusted by a variation of the oscillator frequency.

With the exception of the elements 16, 17 and 18, the part of the arrangement so far described is known per se. This part permits of obtaining, independently of mains voltage fluctuations or frequency variations of the incoming high-frequency signal, a substantial coincidence of the produced image carrier with the centre of the Nyquist flank.

This is evident from FIG. 2; FIG. 2*a* illustrates the idealised frequency characteristic curve of the receiver. By way of example, the conventional medium frequencies are indicated in mc./s. for a European 625-line system. The frequency of the image carrier is 38.9 mc./s., that of the sound carrier 33.4 mc./s., whilst the adjacent sound carrier amounts to 40.4 mc./s. and the adjacent image carrier to 31.9 mc./s. The so-called Nyquist flank extends over a range of about 1.5 mc./s. between 38.15 mc./s. and 39.65 mc./s. The discriminator circuit of FIG. 1 furnishes a direct voltage, of which the value varies as a function of the frequency of the signal supplied to the valve 7. This variation in the arrangement shown in this figure is illustrated in FIG. 2*b* by the curve 30. Moreover, the latter figure illustrates the control-curves 31, 32 and 33 of the local oscillator.

If the frequency of the produced medium-frequency image carrier is just equal to 38.9 mc./s., the control-curve (line 31) passes through the point of the horizontal axis determined by this frequency, so that the discriminator does not develop any voltage. If this frequency, however, deviates from the said value, for example, towards a higher frequency $f_1$, the control-curve 32 intersects the horizontal axis at this higher frequency $f_1$ and the discriminator yields a positive voltage, by which the oscillator is readjusted so that the frequency of the medium-frequency image carrier will amount to $f_2$. If the said frequency deviates towards a lower value, for example $f_3$, the discriminator produces a negative voltage (line 33) and the frequency is readjusted to a value $f_4$.

It will be evident that the steeper the central flank of the curve 30 and the more horizontal the control-curve of the oscillator, the smaller will be the final frequency deviation from the value of 38.9 mc./s.

Under certain conditions, however, it is desirable for this deviation to be larger. As stated in the preamble this is the case, when a comparatively weak signal is received. If in this case from a given intensity of the incoming signal the position of the image carrier is shifted towards the peak of the Nyquist flank, i.e. towards the 38.15 mc./s. value, the amplitudes of the image carrier and of the lower frequencies will be attenuated to a smaller extent than in the case in which the image carrier is maintained substantially at the value of 38.9 mc./s.

In accordance with the principle of the invention these results may be realized in two ways:

(1) By shifting the curve 30 as a whole in a horizontal direction as a function of the intensity of the incoming signal (FIG. 2*c*), and (2) By causing the curve 30 to shift as a whole in a vertical direction as a function of the intensity of the incoming signal (FIG. 2*d*).

From FIG. 2*c* it is evident that, if without the shift the curve 31 would pass just through the point determined by the frequency of 38.9 mc./s., the frequency of the produced image carrier, subsequent to the shift of the curve 30 towards the position indicated by the curve 35, would just be 38.15 mc./s.

The first principle can be realized by detuning, in the arrangement shown in FIG. 1, the circuit 11 by means of the capacitors 16 and 17 provided in accordance with the invention and of the diode 18, operating as a variable capacity. This diode 18 may be inter alia a junction diode, for example, a germanium or silicon pn-diode, or a point-contact diode. As an alternative, the diode 18 may be replaced by a capacitor with a ferro-electric dielectric, which has the property that upon an increase of the direct voltage applied thereto the capacity value decreases. Such a dielectric may consist, for example, of a bariumtitanate compound.

If the diode is a pn-junction diode, the capacity value thereof $C_d$ will vary as a function of the applied voltage $V_d$ in accordance with the relation:

$$C_d = \frac{K}{\sqrt{|V_{d4}}}$$

wherein K designates a proportionality constant. The polarity of $V_d$ must be such that the diode 18 is blocked. The variation in $C_d$ as a function of $V_d$ is illustrated in FIG. 3*c*.

The information for the control of the diode 18 is derived, in accordance with the principle of the invention, from the automatic gain control-voltage. Use is made of the medium-frequency valve 2, controlled by the said voltage, of which valve the $I_a-V_g$-characteristic is shown in FIG. 3*a*. This is a control-characteristic curve with which, in the case of a very strong incoming signal $V_i$, i.e. if the automatic gain control-voltage has a high negative value, the current passing through the valve 2 has decreased to a very low value. This occurs at a value of $-V_{g1}$ volts, at which value lies the knee of the $I_a-V_g$-characteristic curve. If the signal $V_i$ is still stronger, the voltage for the automatic gain control increases, it is true, but the current passing through the valve 2 decreases only little, as is evident from FIG. 3*a*. If the signal $V_i$ is weaker, the negative grid voltage $-V_g$ decreases and when it passes the value $-V_{g1}$, $I_a$ increases strongly.

Across the resistor 36 in the anode circuit of valve 2, decoupled with the aid of a capacitor 37, is thus produced a voltage drop as a function of the incoming signal $V_i$, which is illustrated in FIG. 3*b* by the curve $V_{Ra}$. For this curve it is assumed that use is made of a delayed automatic gain control-voltage, so that only at a value of 20μv. of $V_i$ this voltage becomes operative. It is furthermore assumed that at about 500 μv. of $V_i$ the knee of the $I_a-V_g$-characteristic curve is attained, so that from this value onwards $V_{Ra}$ remains substantially constant. The voltage $V_{Ra}$ is fed via the conductor 38 and the coil 39 to the cathode of the diode 18.

With the aid of a gas discharge tube 40 or a different non-linear element and the resistor 41, a stabilized voltage of a value $V_n$ (see FIG. 3*b*) is produced across the resistor 41, this voltage being fed via the conductor 42 and the coil 43 to the anode of the diode 18. Thus the cutting-off voltage $V_d$, determined by:

$$V_d = V_{Ra} - V_n$$

is produced across the diode 18.

If at least the element 18 is capable of supporting a large potential difference, $V_n$ may be, if desired, rendered equal to zero volt, so that the parts 40 and 41 may be dispensed with.

With a strong incoming signal $V_i$ of, for example, 1 mv., this voltage across the diode 18 is equal to $V_{d1}$ and the capacity value is low, so that the resonance frequency of the circuit 11 is high, i.e. 38.9 mc./s. If the intensity of $V_i$ drops below 500 μv., $V_d$ also drops, so that $C_d$ increases and the resonance frequency of the circuit 11 decreases and the curve 30 of FIG. 2*c* shifts to the left. If $V_i$ has dropped to about 20 μv., $V_d$ has decreased to a value $V_{d3}$ (FIG. 3*c*) and the curve 30 shifts to the extreme position indicated by the curve 35.

It is also possible to derive the control voltage for the diode 18 from a high resistor in the cathode lead of valve 2. In this case $V_n$ must always be positive relative to the voltage drop across this cathode resistor and hence the diode 18 must be inversed.

For a satisfactory operation of the arrangement according to the invention the following parts are furthermore required:

In the first place are required the coils 39 and 43, which have a high impedance for the frequency region over which the image carrier is shifted and which provide that the medium-frequency oscillations cannot penetrate to the conductors 38 and 42.

In the second place, when the image carrier is shifted in place, the amplitude of the signal emanating from valve 7 must be substantially constant, since, when the image carrier shifts in place, towards the peak of the Nyquist flank, the attenuation of this image carrier will be diminished and hence the control-voltage produced will exceed the value associated with any frequency deviation occurring in this new situation.

The amplitude of the signal produced by valve 7, when the image carrier shifts in place, is kept constant, in accordance with a further embodiment of the arrangement according to the invention, by providing the valve 7 with a special input circuit. This input circuit is formed by the coil 45 and the parasitic capacity 46 between the grid and the cathode of valve 7. This circuit is tuned to about 40 mc./s., so that the attenuation of the Nyquist flank for the shift region concerned is more or less neutralized.

Moreover, the valve 7 operates as a limiter, so that a residual amplitude variation is limited by this limiter action.

The input circuit of valve 7 must be coupled via a low capacity to the output circuit of valve 4. To this end, in the embodiment concerned the inter-electrode capacity 47 between the anode and the collecting grid of valve 4 is employed.

The provision of the said input circuit has an additional advantage in that, when the receiver is switched on or when the transmitter signal is lacking, the thermal or background noise cannot detune the local oscillator to such a frequency that an incoming image carrier is shifted towards the foot of the Nyquist flank.

The frequency spectrum of the noise extends throughout the control-range, so that without the input circuit of valve 7 the lower medium frequencies (formed by the transformed noise components) would become more manifest than the higher frequencies. Curve 30 thus shifts as a whole downwards and the average control-signal (integrated contribution of all noise components) is negative, so that the oscillator is readjusted so that the produced image carrier shifts toward the foot of the Nyquist flank.

By providing the said input circuit is is ensured that the integrated contribution of all noise components is zero, so that the oscillator is not readjusted by it.

The influence of long interference pulses is obviated by supplying via the capacitor 48 interference pulses with blocking polarity to the collecting grid of valve 7. These interference pulses are preferably obtained from a frequency-selective interference separator.

If the shift-control along the Nyquist flank is to be neutralized, the conductor 38 can be connected with the aid of the switch 49 directly to the supply voltage of $V_b$ volt. Thus the voltage at the diode 18 becomes equal to $V_{d2}$ volt, which value differs only little from $V_{d1}$. From the curve of FIG. 3*c* it is evident that the variation of $C_d$ thus produced is negligible, so that the circuit 11 remains tuned approximately to 38.9 mc./s.

The shift of the image carrier according to the second principle (FIG. 2*d*) may be achieved with the aid of the arrangement shown in FIGS. 4 or 5. In these figures only those parts of the arrangement shown in FIG. 1 are shown, which are necessary for a good understanding of this second principle.

Referring to FIG. 4, the conductor 38 connects the resistor 36 to the resistor 50 of the potentiometer circuit comprising this resistor and the variable resistor 51. With the aid of the resistor 51 the automatic frequency control can be adjusted. Assuming that the produced image carrier lies just at 38.9 mc./s., the voltage at the capacitor 23 will be zero volt and the valve 24 conveys a certain amount of current, which is determined by the cathode resistor 52. In this state the voltage drop across the resistor 52 must be equal to that across 51, which can be obtained with the aid of the variable resistor, when the oscillator is not operative.

If owing to frequency of the incoming or of the oscillator signal the voltage at the resistor 52 exceeds that at the resistor 51, the internal resistance of the diode 25 decreases and the oscillator frequency is readjusted so that the image carrier shifts to the left. In the opposite case the internal resistance of the diode 25 increases and the frequency of the image carrier shifts to the right (see FIG. 2).

In the event of a weak signal $V_1$, however, the voltage on the conductor 38 will drop; this means that the voltage across the resistor 52 rises with respect to that across the resistor 51, so that the curve 30 shifts in a positive direction. This is shown in FIG. 2*d*. In this figure curve 54, for example, indicates the extreme position towards which the discriminator curve as a function of the signal intensity can be shifted.

The same result is attained with the aid of the arrangement shown in FIG. 5. The voltage for shifting the curve 30 is not obtained in this case from the resistor 36, but from the cathode resistor 55 of valve 2. The resistor 55 is connected via the conductor 56 to the lower end of the cathode resistor 52. In the case of a strong signal $V_1$ the voltage across the resistor 55 is low and the conductor 56 is at a potential, which differs only little from earth potential. If the incoming signal $V_1$ is weaker, the voltage across the resistor 55 increases and hence also the voltage at the cathode of valve 24, so that the curve 30 shifts upwards.

With the aid of the switch 57, the conductor 56 can be connected to earth to switch out the shifting mechanism.

The aforesaid principle may also be applied, if the circuit 11 is not tuned to the image carrier frequency but to the sound carrier frequency; in this case the circuit 45, 46 must, of course, be adapted. This method has the disadvantage, however, that the amplitude of the incoming sound carrier, owing to the much greater attenuation in this frequency range (see FIG. 2*a* at 33.4 mc./s.) is comparatively small with respect to that of the image carrier, so that frequency control will be less effective with the same amplification factor of the discriminator circuit and the same control-curve of the local oscillator.

What is claimed is:

1. Automatic frequency control means for a superheterodyne receiver of the type having a mixing stage, local oscillator means connected to said mixer stage for producing a medium frequency signal having an image carrier, frequency discriminator means providing a control voltage responsive to the frequency of said medium frequency signal to adjust the frequency of said local oscillator, and means providing an automatic gain control voltage, said automatic frequency control means comprising discriminator control means connected to said discriminator means, and means applying said automatic gain control voltage to said discriminator control means so that the position of the medium frequency image carrier shifts with respect to the frequency characteristics of said discriminator in response to the amplitude of said automatic gain control voltage.

2. Automatic frequency control means for a superheterodyne receiver of the type having a mixing stage, local oscillator means connected to said mixer stage for producing a medium frequency signal having an image carrier, frequency discriminator means providing a control voltage responsive to the frequency of said medium frequency signal to adjust the frequency of said local oscillator, and means providing an automatic gain control voltage, said receiver having a frequency characteristic which exhibits a Nyquist flank, said automatic frequency control means comprising discriminator means, and means applying said automatic gain control voltage to said discriminator control means so that the position of the medium frequency carrier shifts toward the peak of said Nyquist flank in response to the reception of weak signals by said receiver.

3. A superheterodyne television receiver comprising an input circuit connected to a mixer stage, local oscillator means connected to said mixer stage for producing a medium frequency signal having an image carrier, frequency discriminator means providing a control voltage responsive to the frequency of said medium frequency signal for adjusting the frequency of said local oscillator, said receiver having a frequency characteristic which exhibits a Nyquist flank, means providing an automatic gain control voltage, said discriminator means comprising a circuit tuned to said medium frequency image carrier, control means comprising a series combination of at least one capacitor and a voltage dependent variable impedance element, said series combination being connected in parallel with said tuned circuit, and means for applying said automatic gain control voltage to said voltage dependent variable impedance element.

4. The television receiver of claim 3, in which said variable impedance element is a semi-conductor diode, the voltage applied thereto having a polarity that blocks said diode.

5. The television receiver of claim 3, in which said variable impedance element comprises a capacitor with a ferroelectric dielectric.

6. The television receiver of claim 3, comprising an electron discharge device having a control electrode, an output electrode, and a cathode, means connecting one end of said impedance element to said output electrode, means connecting the other end of said impedance element to a source of constant potential, and means applying said automatic gain control voltage to said control electrode.

7. The television receiver of claim 6, in which said source of constant potential comprises a potentiometer circuit of a series combination of a gas discharge tube and a first resistor, said other end of said impedance element being connected to the junction of said first resistor and gas discharge tube, and a second resistor is connected to the output electrode of said electron discharge device, the voltage at said junction being lower than the maximum voltage obtainable at said output electrode.

8. The television receiver of claim 6, in which said source of constant potential comprises a potentiometer circuit of a series combination of a gas discharge tube and a first resistor, said other end of said impedance element being connected to the junction of said first resistor and gas discharge tube, a second resistor being connected to said cathode, the voltage at said junction exceeding the maximum voltage drop across said second resistor.

9. A superheterodyne television receiver comprising an input circuit connected to a mixer stage, local oscillator means connected to said mixer stage for producing a medium frequency signal having an image carrier, frequency discriminator means providing a control voltage responsive to the frequency of said medium frequency signal for adjusting the frequency of said local oscillator, said receiver having a frequency characteristic which exhibits a Nyquist flank, means providing an automatic gain control voltage, adding circuit means connected to said frequency discriminator means, and means applying said automatic gain control voltage to said adding circuit means so that the position of the medium frequency carrier shifts toward the peak of said Nyquist flank in response to the reception of weak signals by said receiver.

10. The television receiver of claim 9, comprising a diode coupled capacitively to said local oscillator means, an amplifying device having an input circuit and an output circuit, means connecting said discriminator means to said input circuit, means connecting said output circuit to one terminal of said diode, said adding circuit comprising a potentiometer circuit, means applying said automatic gain control voltage to said potentiometer circuit, and means connecting a tap on said potentiometer circuit to the other terminal of said diode.

11. The television receiver of claim 9, comprising a diode coupled capacitively to said local oscillator means, an amplifying device having an input circuit and an output circuit, means connecting said discriminator means to said input circuit, means connecting said output circuit to one terminal of said diode, means connecting the other terminal of said diode to a direct voltage source, supply source means for said amplifying device, and means applying said automatic gain control voltage to said supply source means so that the supply voltage of said amplifying device varies in response to variations in said automatic gain control voltage.

References Cited in the file of this patent

UNITED STATES PATENTS

| | | |
|---|---|---|
| 2,504,663 | Dome | Apr. 18, 1950 |
| 2,896,018 | Rhodes et al. | July 21, 1959 |
| 2,916,545 | Baugh | Dec. 8, 1959 |